United States Patent
Venkataraman et al.

(10) Patent No.: US 11,132,049 B2
(45) Date of Patent: *Sep. 28, 2021

(54) METHODS AND APPARATUS FOR ADAPTIVE POWER PROFILING IN A BASEBAND PROCESSING SYSTEM

(71) Applicant: Marvell Asia Pte, Ltd., Singapore (SG)

(72) Inventors: Kalyana S Venkataraman, Santa Clara, CA (US); Gregg A Bouchard, Georgetown, TX (US); Eric Marenger, Montreal (CA); Ahmed Shahid, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 120 days.

This patent is subject to a terminal disclaimer.

(21) Appl. No.: 16/546,153

(22) Filed: Aug. 20, 2019

(65) Prior Publication Data
US 2019/0369698 A1 Dec. 5, 2019

Related U.S. Application Data

(63) Continuation of application No. 15/595,667, filed on May 15, 2017, now Pat. No. 10,423,215.

(51) Int. Cl.
*G06F 1/32* (2019.01)
*G06F 9/50* (2006.01)
*G06F 1/329* (2019.01)

(52) U.S. Cl.
CPC .......... *G06F 1/329* (2013.01); *G06F 9/5094* (2013.01); *G06F 9/5044* (2013.01); *G06F 2209/508* (2013.01)

(58) Field of Classification Search
CPC .............................. G06F 1/329; G06F 9/5044
See application file for complete search history.

(56) References Cited

U.S. PATENT DOCUMENTS

| | | | | |
|---|---|---|---|---|
| 8,689,021 | B1 * | 4/2014 | Bai | G06F 1/28 713/300 |
| 2012/0260258 | A1 * | 10/2012 | Regini | G06F 1/3287 718/104 |
| 2015/0323982 | A1 * | 11/2015 | Davis | G11C 7/1072 711/105 |
| 2017/0075408 | A1 * | 3/2017 | Banerjee | G06F 1/324 |
| 2017/0329628 | A1 * | 11/2017 | Zhang | G06F 1/3293 |

* cited by examiner

*Primary Examiner* — Stefan Stoynov
(74) *Attorney, Agent, or Firm* — JW Law Group; James M. Wu

(57) ABSTRACT

Methods and apparatus for adaptive power profiling in a baseband processing system. In an exemplary embodiment, an apparatus includes one or more processing engines. Each processing engine performs at least one data processing function. The apparatus also includes an adaptive power profile (APP) and a job manager that receives job requests for data processing. The job manager allocates the data processing associated with the job requests to the processing engines based on the adaptive power profile. The adaptive power profile identifies a first group of the processing engines to perform the data processing associated with the job requests, and identifies remaining processing engines to be set to a low power mode.

24 Claims, 7 Drawing Sheets

METHODS AND APPARATUS FOR ADAPTIVE POWER PROFILING IN A BASEBAND PROCESSING SYSTEM

PRIORITY

This patent application is a continuation patent application of a co-pending U.S. patent application having a U.S. patent application Ser. No. 15/595,667, filed on May 15, 2017 in the name of the same inventor and entitled "Methods and Apparatus for Adaptive Power Profiling in A Baseband Processing System," which has been issued into a U.S. patent with a U.S. Pat. No. 10,423,215, which is hereby incorporated herein by reference in its entirety.

FIELD

The exemplary embodiments of the present invention relate to the operation of communications networks. More specifically, the exemplary embodiments of the present invention relate to methods and apparatus for processing data in a communication system.

BACKGROUND

With the rapidly growing trend of mobile and remote data access over high-speed communication networks, such as 3G, 4G, or LTE cellular services, accurately delivering data has become increasingly challenging and difficult. A high-speed communication network that is capable of delivering information includes, but is not limited to, a wireless network, a cellular network, wireless personal area network ("WPAN"), wireless local area network ("WLAN"), wireless metropolitan area network ("MAN"), or the like. These networks typically utilize different transmission or network protocols based on industry standards for each protocol.

Currently, well defined baseband processing is used to implement each protocol. For example, in a transmitting device, data to be transmitted flows through specific processing stages to generate a transmit signal that can be transmitted over the air (OTA). The processing stages provide specific functions, such as rate mapping, encoding, decoding, and modulation. The functions of the processing stages can be reversed to process received signals and convert these signals back to the original data.

However, low power baseband processor systems are a relatively new area of focus for many researchers who are motivated to seek novel and efficient ways to dispatch and process complex, power hungry jobs across multiple baseband signal processing stages. Conventional baseband processor systems have disadvantages in that the increased complexity of baseband processing algorithms and the increased power envelope create significant thermal problems. A typical low power baseband processor implementation may provide basic power savings by disabling an entire processing chain when not in use. However, what is lacking is a way to control overall power utilization in an intelligent fashion, for example, by taking into account parameters, such as the operation of each processing stage in a processing chain, the types of processing functions to be performed, and how the processing stages are assigned to perform various processing functions.

Therefore, it is desirable to have an intelligent adaptive power profiling mechanism to control power utilization across multiple baseband signal processing stages to reduce dynamic power consumption in a baseband processing system.

SUMMARY

In various exemplary embodiments, methods and apparatus are provided for an adaptive power profile (APP) that is used to intelligently control power utilization across multiple baseband signal processing stages to reduce dynamic power consumption and provide load balancing.

In various exemplary embodiments, a multi-function element that performs baseband processing includes the adaptive power profile to adaptively control power and/or performance of one or more processing engines. During operation, the processing engines are allocated job requests based on the adaptive power profile to achieve a desired power consumption and/or performance characteristic. Processing engines that are not utilized are gated into a low power mode (LPM), thereby reducing power consumption. In an exemplary embodiment, the adaptive power profile is selected from several profiles based on the desired system power utilization and/or performance. The adaptive power profiles can be pre-calculated and stored, dynamically updated, or generated on the fly to achieve the desired system power utilization and/or performance.

In an exemplary embodiment, a multi-function element includes a job manager that monitors a variety of parameters, such as the number of processing jobs to be performed, the number of processing engines available to complete the processing jobs, the state of current jobs being processed, and the number of simultaneous jobs to be performed in order to perform adaptive power profiling. For example, given the state of the above parameters, a particular APP can be selected and utilized to achieve the desired system power utilization and/or performance.

In an exemplary embodiment, an APP can dynamically change at runtime based on current or anticipated power requirements. For example, during nighttime the number of users of a base station may be less than during daytime. Thus, an APP is selected to process user data to reduce overall system power at night. During daytime when more baseband traffic needs to be processed, a different APP is utilized since higher power consumption may be tolerated to process the increased number of users.

In an exemplary embodiment, an apparatus is provided that includes one or more processing engines. Each processing engine performs at least one data processing function. The apparatus also includes an adaptive power profile (APP) and a job manager that receives job requests for data processing. The job manager allocates the data processing associated with the job requests to the processing engines based on the adaptive power profile. The adaptive power profile identifies a first group of the processing engines to perform the data processing associated with the job requests, and identifies remaining processing engines to be set to a low power mode.

In an exemplary embodiment, a method is provided that includes operations of receiving job requests for data processing by a plurality of processing engines, allocating the data processing associated with the job requests to a first group of processing engines based on an adaptive power profile, and setting remaining processing engines to a low power mode.

Additional features and benefits of the exemplary embodiments of the present invention will become apparent from the detailed description, figures and claims set forth below.

BRIEF DESCRIPTION OF THE DRAWINGS

The exemplary embodiments of the present invention will be understood more fully from the detailed description given

DETAILED DESCRIPTION

Figure 1:
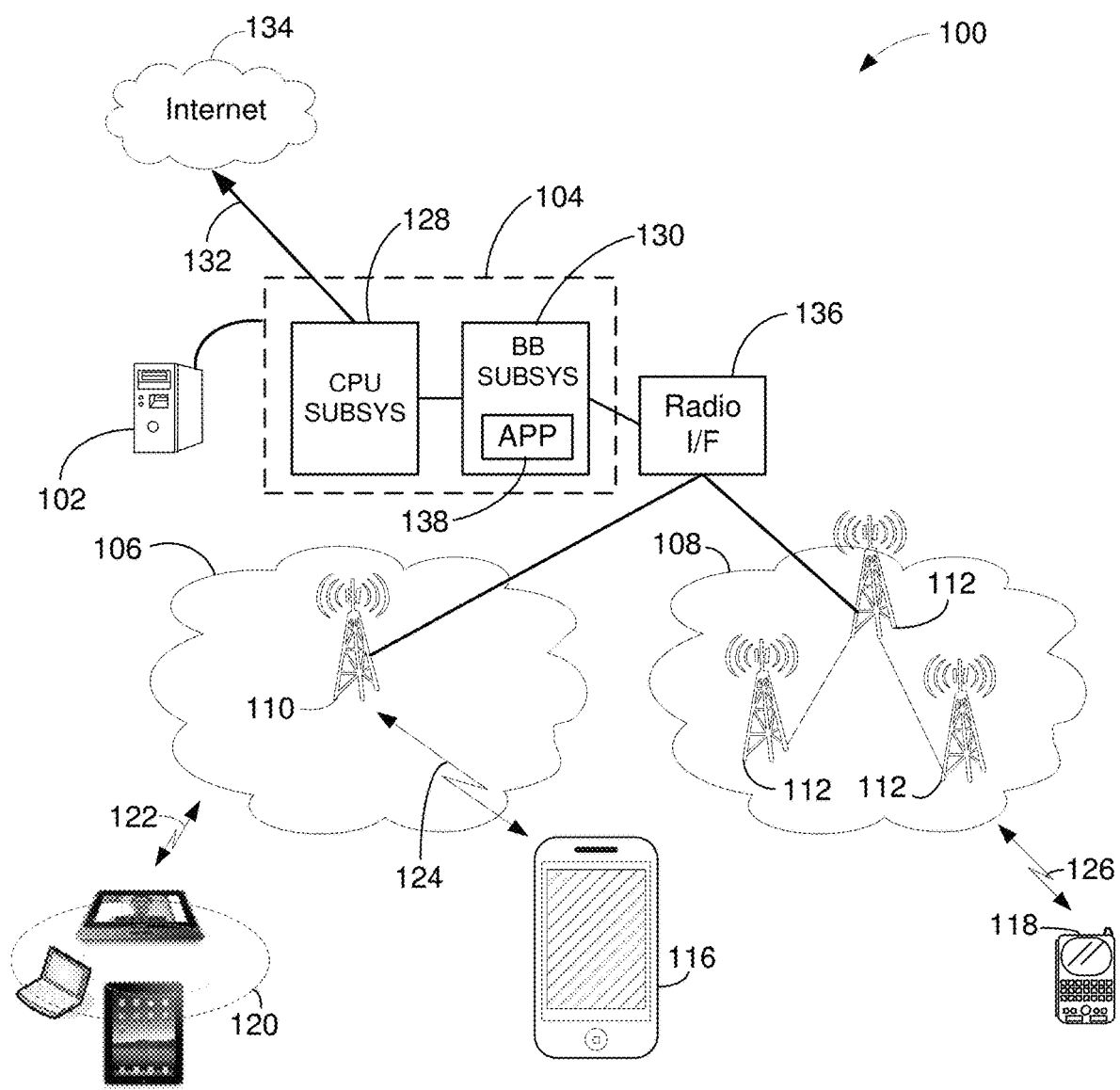
FIG. 1 shows an exemplary block diagram illustrating a communications network that includes a base station with a baseband processor subsystem having a novel adaptive power profile constructed in accordance with exemplary embodiments of the present invention.

The purpose of the following detailed description is to provide an understanding of one or more embodiments of the present invention. Those of ordinary skill in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and business related constraints, and that these specific goals will vary from one implementation to another and from one developer to another. Moreover, it will be understood that such a development effort might be complex and time-consuming, but would nevertheless be a routine undertaking of engineering for those of ordinary skill in the art having the benefit of the embodiments of this disclosure.

Various exemplary embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, sub-systems, devices, packet switch elements, packet switches, access switches, routers, networks, modems, base stations, eNB ("eNodeB"), computer and/or communication devices or mechanisms, or combinations of components thereof. The term "computer" includes a processor, memory, and buses capable of executing instructions wherein the computer refers to one or a cluster of computers, personal computers, workstations, mainframes, or combinations of computers thereof.

FIG. 1 shows an exemplary diagram illustrating a communications network 100 that includes a base station 102 with a baseband processor 104 having a novel APP 138 constructed and utilized in accordance with exemplary embodiments of the present invention. Network 100 includes two cell sites 106 and 108 and can be configured as a third generation ("3G"), 4G, LTE, or 5G network configuration or other type of wireless network configuration.

Cell sites 106 and 108 include radio towers 110 and 112. Radio towers 110 and 112 are further coupled to various user equipment (UE) devices, such as a tablets and/or iPad® 120, cellular phone 116, and handheld device 118, via wireless communications links 122, 124, and 126. Cell site 106 facilitates network communication between mobile devices such as UEs 120 and 116 and the base station 102 via radio tower 110 and cell site 108 facilitates network communication between UE 118 and the base station 102 via radio tower 112. It should be noted that the cell sites 106 and 108 can include additional radio towers as well as other land switching circuitry.

In an exemplary embodiment, the baseband processor 104 comprises a CPU subsystem 128 having general purpose CPU resources for packet processing, and a baseband processor subsystem 130 that includes the novel APP 138 to control power utilization and load balancing across multiple baseband signal processing blocks. For example, in an exemplary embodiment, the APP 138 controls power utilization and load balancing for a variety of fixed or programmable processing engines that perform basic fixed radio functions (e.g., FFT, error correction, and channel decoding) and digital signal processing functions. Additional descriptions of the novel APP 138 are provided below.

Figure 2:
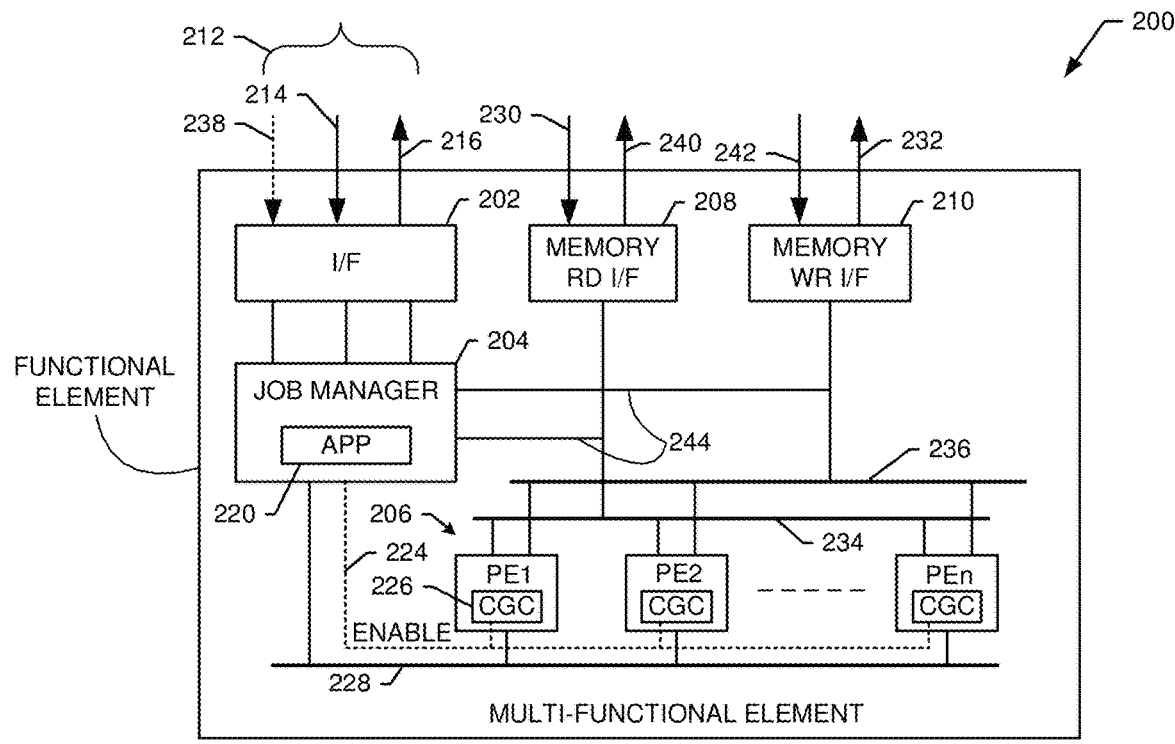
FIG. 2 shows an exemplary embodiment of a multi-function element (MFE) that includes an adaptive power profile for use with the baseband processor subsystem shown in FIG. 1.

FIG. 2 shows an exemplary embodiment of a multi-function element (MFE) 200 for use with the baseband processor subsystem 130. For example, the MFE 200 is suitable for use as part of the baseband subsystem 130 shown in FIG. 1. In an exemplary embodiment, the MFE 200 performs multiple processing functions, such as FFT, Turbo decoder, and/or any other types of processing functions.

The MFE 200 comprises an interface 202, job manager 204, memory read interface 208 and memory write interface 210. The MFE 200 also comprises a plurality of processing engines (PE) (1-n) that are capable of performing one or more processing functions. The job manager 204 communicates with the processing engines using bus 228.

The interface 202 comprises any suitable processor, hardware, firmware, and/or discrete components to allow the job manager 204 to receive job requests for processing to be performed by the MFE 200. For example, in an exemplary embodiment, the interface 202 communicates with the baseband processor subsystem using bus 212 to receive job requests.

The memory read interface 208 comprises any suitable processor, hardware, firmware, and/or discrete components to allow memory access to an external memory. For example, in an exemplary embodiment, the memory read interface 208 interfaces with a shared memory using read bus 230 and read request line 240 to perform memory reads. In an exemplary embodiment, the memory read interface 208 performs direct memory access (DMA) to the memory.

The memory write interface 210 comprises any suitable processor, hardware, firmware, and/or discrete components to allow memory access to the memory. For example, in an exemplary embodiment, the memory write interface 210 interfaces with the memory using write bus 232 and write commit line 242 to perform memory writes. In an exemplary embodiment, the memory write interface 210 performs direct memory access (DMA) to the memory.

In an exemplary embodiment, the processing engines 206 access the memory read interface 208 using memory read bus 234 and access the memory write interface 210 using memory write bus 236. Each of the processing engines 206 includes a clock gating circuit (CGC) 226 that receives an enable signal 224 from the APP 220 managed by the job manager 204. When enabled, the clock gating circuit 226 allows the corresponding processing engine 206 to receive a system clock that is used to perform data processing. When disabled, the clock gating circuit 226 disables the system clock at the associated processing engine 206 to place that processing engine in a low power mode. It should be noted that the clock gating circuit 226 may also control the power utilization of each processing engine 206 in other ways, for example, by enabling and disabling the power input to the associated processing engine 206. In an exemplary embodiment, the enable signals 224 may also include signals to enable/disable components of the memory read 208 and memory write 210 interfaces thereby providing additional power savings when those interfaces are not being utilized.

The job manager 204 comprises any suitable processor, state machine, hardware, firmware, and/or discrete components to receive job requests 214 through the interface 202, and in response, to activate one or more of the processing engines to perform data processing identified in the received job requests. In an exemplary embodiment, the job manager 204 comprises hardware queues that are used to queue the job requests as they arrive.

In an exemplary embodiment, the APP 220 managed by the job manager 204 generates clock gating enable signals 224 that are used to individually gate clocks (enable/disable) utilized by the processing engines 206. By gating the clocks used by the engines 206, the job manager 204 is able to set any individual PE to a low power mode or an active mode. The low power mode can be used when a PE is idle to conserve power and the active mode can be used to enable a PE to perform a data processing function. Thus, the job manager 204 is able to dynamically and individually control the clock gating enable signals across the set of PEs 206 to control overall power utilization and/or performance of the MFE 200.

In an exemplary embodiment, the job manager 204 comprises one or more adaptive power profiles 220 that define how jobs are to be allocated to the processing engines 206 to achieve a desired performance level or a particular performance versus power utilization ratio. For example, the job manager monitors a variety of parameters, such as the number of processing jobs to be performed, the number of processing engines available to complete the processing jobs, the state of current jobs being processed, and the number of simultaneous jobs to be performed in order to perform adaptive power profiling. For example, given the state of the above parameters, a particular APP can be selected and utilized to achieve the desired system power utilization and/or performance.

The following types of adaptive power profiles can be utilized; however, it should be noted that the exemplary embodiments are not limited to the following adaptive power profiles and that a wide range of adaptive power profiles can be utilized.

1. Standard APP—Received job requests are assigned to available processing engines and unused processing engines are placed in a low power mode.
2. Reduced power APP—Received job requests are assigned to the fewest number of processing engines possible and unused processing engines are placed in a low power mode.
3. Increased performance APP—Received jobs are assigned to all available processing engines to achieve parallel processing and/or pipeline processing to perform the greatest amount of processing within the TTI and unused processing engines are placed in a low power mode.

Thus, the job manager 204 allocates the received job requests to the processing engines 206 according to a selected APP 220. In an exemplary embodiment, there are multiple APPs available for the job manager 204 to utilize. In one embodiment, the job manager 204 makes a decision locally as to which APP to utilize to complete one or more job requests. For example, the job manager 204 may use the number of job requests in a queue to determine which APP to use. In another embodiment, the job manager 204 may receive an APP selection indicator 238 from the baseband processor system 130 that indicates the APP to be utilized. In still another exemplary embodiment, the job manager 204 dynamically programs the APP 220 or otherwise generates the selected APP to be utilized. The dynamic generation of the APP 220 may also be based on the received APP selection indicator 238.

The processing engines 206 access the memory using the interfaces 208 and 210. In an exemplary embodiment, the processing engines 206 utilize a processing cycle to perform a processing function to complete a job request. In an exemplary embodiment, the processing cycle comprises a memory read operation, data processing operation, and a memory write operation. For example, the processing engines 206 access the memory using the memory read interface 208 to acquire data from the memory. The retrieved data is then processed according to some selected function. After the data processing operation is completed, the processing engines access the memory using the memory write interface 210 to write processed data to the memory. The job manager 204 also has access (as indicated at 244) to the memory read 208 and memory write 210 interfaces to allow the job manager 204 to access the memory. For example, the job manager 204 may access the memory when performing memory pre-fetches to support pipeline processing performed by the processing engines 206. Upon completion of each job request, the job manager 204 sends a job complete indicator 216 through bus 212 using the interfaced 202.

Thus, the MFE 200 operates to receive job requests and allocates those jobs to one or more processing engine 206 to be processed in accordance with a selected APP 220. The selected APP is used to determine how jobs are allocated to a first portion of the processing engines 206 and also determines a second portion of the processing engines 206 that are placed in a low power mode. The processing engines 206 that are allocated jobs, perform one or more processing cycles to obtain data from a memory, process the data using one or more processing functions, and then write the processed data back into the memory. The job manager 204 can queue receive job requests 214 as they arrive and send out corresponding job completion indicators 216 as each job is completed.

Figure 3:
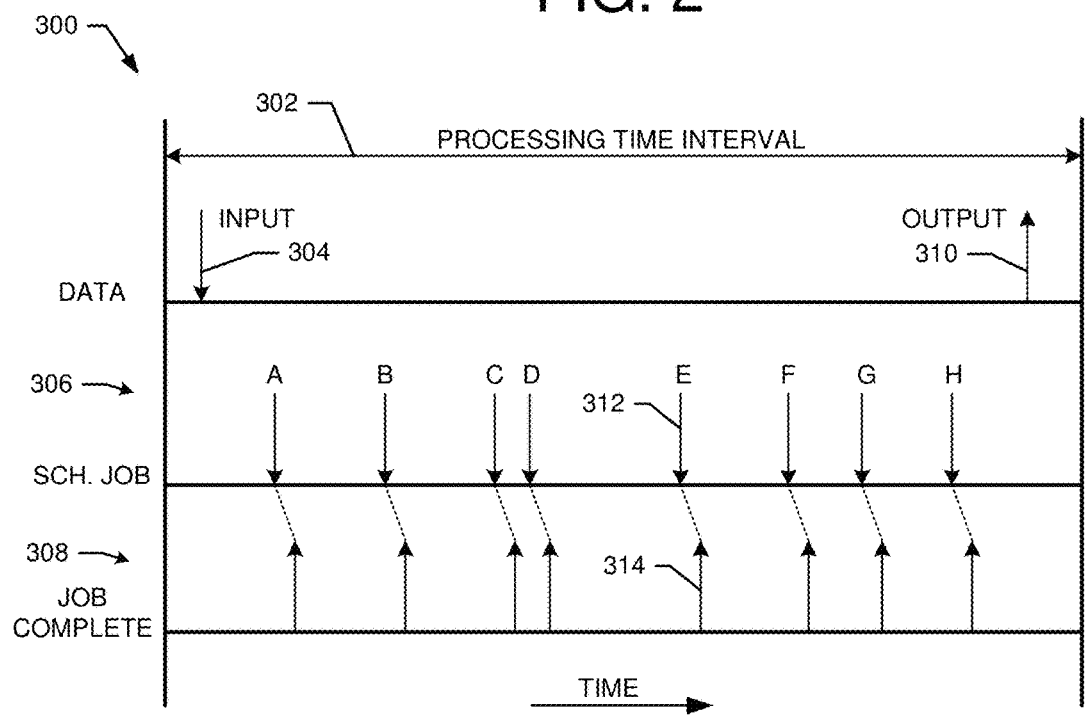
FIG. 3 shows an exemplary embodiment of a timing diagram that illustrates how the MFE shown in FIG. 2 completes jobs over a processing time interval.

FIG. 3 shows an exemplary embodiment of a timing diagram 300 that illustrates how the MFE 200 completes jobs over a processing time interval 302. In an exemplary embodiment, the processing time interval 302 is a transmission time interval (TTI) of a frame or subframe of a wireless communication system. However, it should be noted that the processing time interval 302 can be any desired time interval. At the beginning of the processing time interval 302 data is stored into a memory as indicated at 304. For example, in one embodiment the data represents baseband data to be prepared for transmission over a wireless communication link. In another embodiment, the data represents samples of a received wireless transmission to be demodulated and decoded.

In this exemplary embodiment, the MFE 200 receives job requests (A-H) that occur at various time instances within the processing time interval 302. The MFE 200 may control the processing engines 206 to process the jobs (A-H) independently or in sequential fashion where a particular job may process data that resulted from a previously completed job. For each job, processed data is written back into the memory and a corresponding job completion indicator 308 is output by the MFE. For example, when job (E) 312 completes and processed data is written back into the memory, the completion indicator 314 is issued. Thus, by utilizing one or more of the processing engines, the MFE 200 can perform a wide variety of uplink, downlink, encoding, decoding, FFT, IFFT, or any other type of processing functions within the designated processing time interval. In an exemplary embodiment, the job manager 204 can issue the enable signals 216 to control the power utilization of each of the processing engine 206 before, between, and after jobs are processed.

Figure 4:
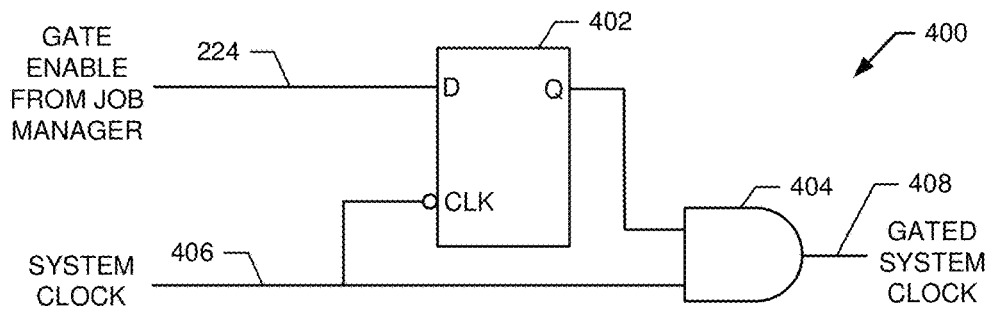
FIG. 4 shows an exemplary embodiment of a clock gating circuit for use with exemplary embodiments of the MFE and adaptive power profile.

FIG. 4 shows an exemplary embodiment of a clock gating circuit 400 for use with an MFE in accordance with the exemplary embodiments of the present invention. For example, the clock gating circuit 400 is suitable for use as the CGC 226 shown in FIG. 2. The clock gating circuit 400 includes a register 402 and a logic AND gate 404. An input terminal (D) of the register 402 receives a gate enable signal 224 from the job manager 204. The register 402 also receives a system clock 406 at an inverted clock input (CLK) terminal. In response to the gate enable signal 224 and the clock input 406, the register 402 generates a latched output at the (Q) terminal that is input to the AND gate 404. The AND gate 404 also receives the system clock 406. The output of the AND gate 404 is a gated system clock 408 that can be used to enable or disable a processing engine thereby controlling its power utilization.

Figure 5:
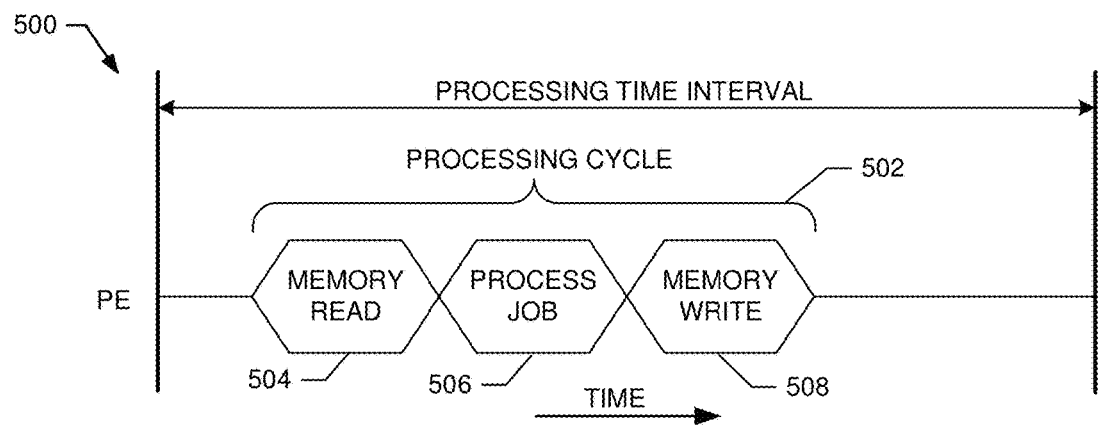
FIG. 5 shows a processing time interval that includes an exemplary embodiment of a processing cycle for use with a processing engine in a multi-function element.

FIG. 5 shows a processing time interval 500 that includes an exemplary embodiment of a processing cycle 502 that can be performed by a processing engine. The processing time interval 500 can be a frame, sub-frame or other time interval. For example, the processing time interval 500 can be 10 or 1 milliseconds in duration. In an exemplary embodiment, the processing cycle 502 comprises a memory read time 504, job processing time 506, and memory write time 508. In an exemplary embodiment, processing cycle 502 can be performed by processing engines of the MFE 200. It should be noted that processing cycle 502 can be repeated multiple times within the processing time interval 500.

Figure 6:
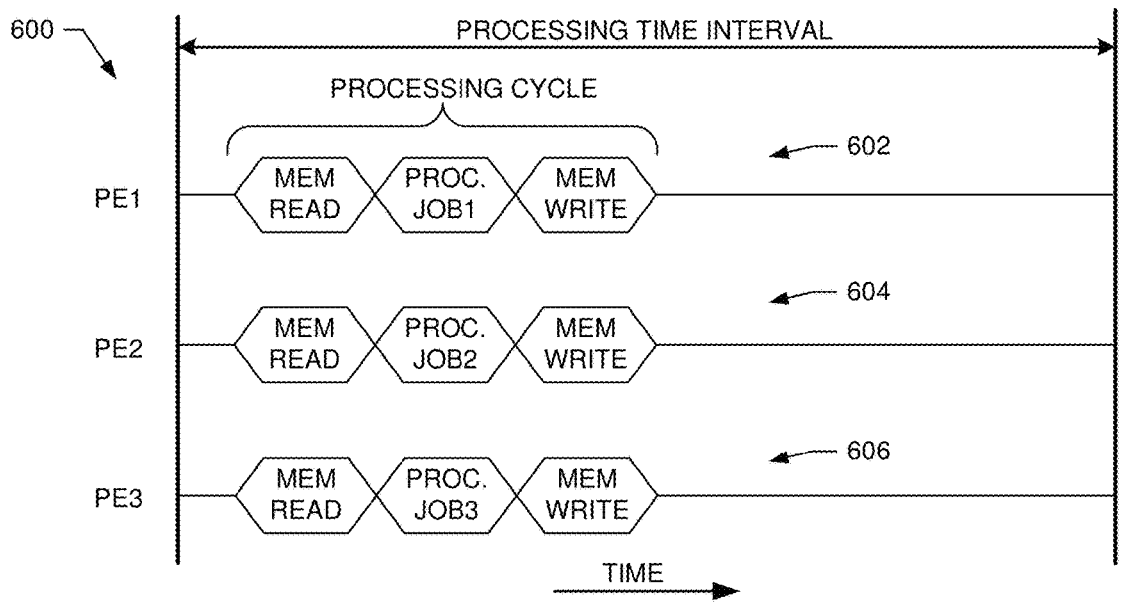
FIG. 6 shows a processing time interval that includes an exemplary embodiment of processing cycles performed by different processing engines in a multi-function element.

FIG. 6 shows a processing time interval 600 that includes an exemplary embodiment of processing cycles performed by different processing engines in a multi-function element. For simplicity, it will be assumed that the processing cycles are performed by three processing engines (PE 1-3) shown in FIG. 2. For example, a first processing cycle 602 is performed by a first processing engine (PE1), a second processing cycle 604 is performed by a second processing engine (PE2), and a third processing cycle 606 is performed by a third processing engine (PE3). Each processing cycle comprises a memory read operation, a processing operation, and a memory write operation. In an exemplary embodiment, the three processing cycles are performed in parallel. Thus, each available processing engine can perform its own processing cycle to generate processed data within one processing time interval.

Figure 7A:
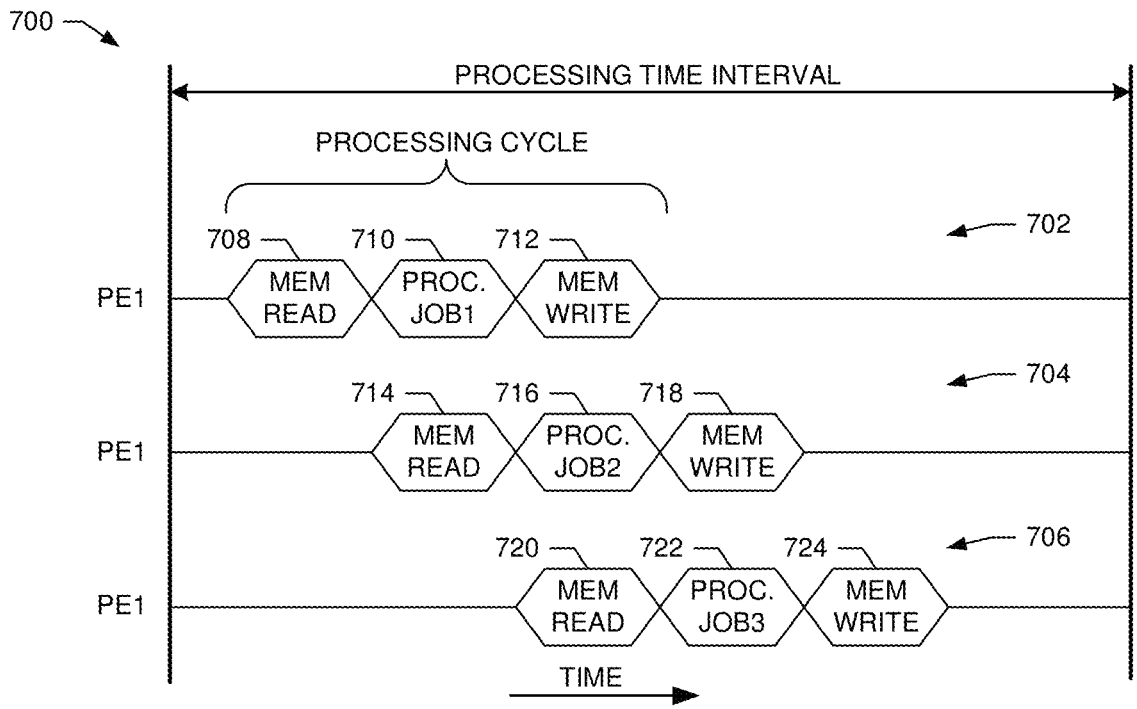
FIGS. 7A-B show exemplary embodiments of pipelined job processing performed by processing engines in a multi-function element during a processing time interval in accordance with the present invention.
Figure 7B:
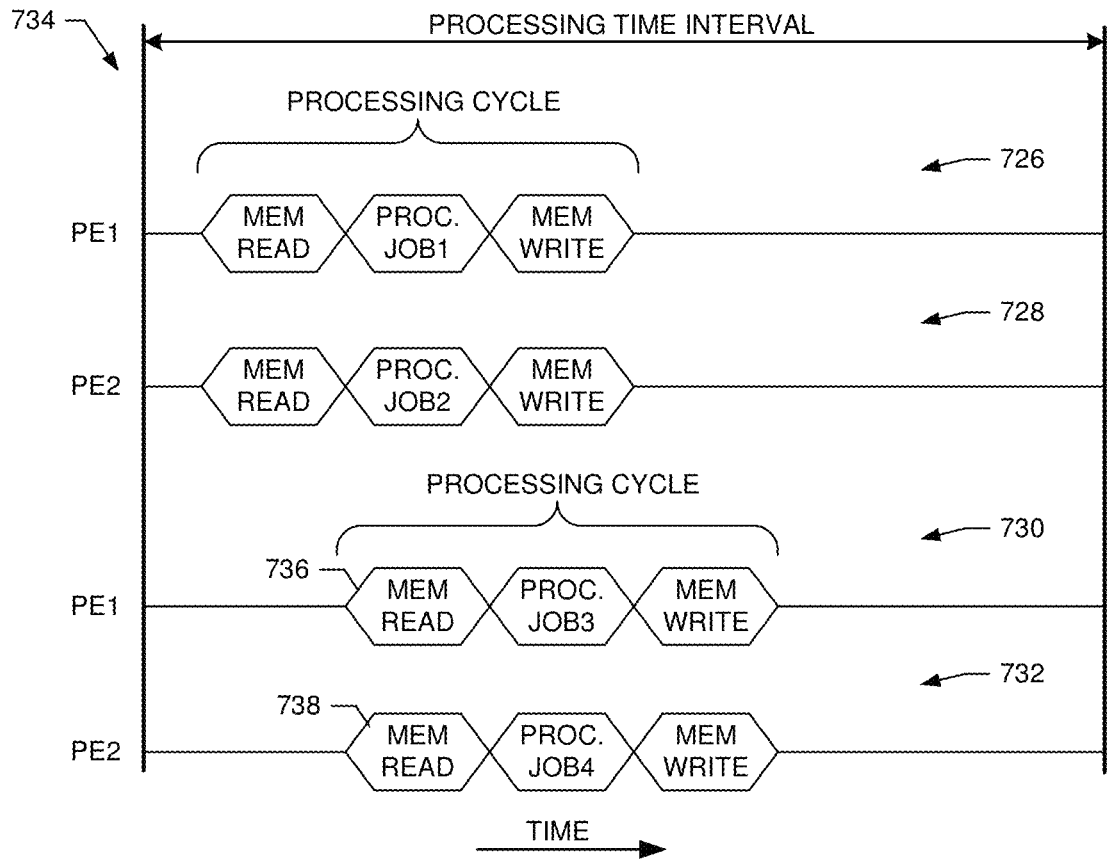

FIGS. 7A-B show exemplary embodiments of pipeline processing performed by processing engines in a multi-function element during a processing time interval in accordance with the present invention.

FIG. 7A shows an exemplary embodiment of a processing time interval 700 that illustrates pipeline processing utilizing one processing engine. For example, the processing time interval 700 comprises a pipeline process wherein three processing cycles 702, 704 and 706 are completed by one processing engine (e.g., PE1). In an exemplary embodiment, the pipeline process starts with a memory read operation 708 for the first processing cycle 702. This is followed by a JOB1 data processing operation 710 and a memory write operation 712. During the data processing operation 710, a memory read operation 714 is performed by the job manager 204 to obtain the data to be processed for JOB2. After initiating a memory write operation 712, the JOB2 data obtained at 714 is processed as shown at 716. The resulting data is then written to memory as shown at 718. During the data processing time 716, a memory read operation 720 is performed by the job manager 204 to obtain the JOB3 data to be processed. After a memory write operation 718 is initiated, the JOB3 data obtained at 720 is processed as shown at 722. The resulting data is then written to memory as shown at 724. Thus, one processing engine is able to complete three jobs within one processing time interval 700 by utilizing the pipeline process.

FIG. 7B shows an exemplary embodiment of a processing time interval 734 that illustrates pipeline processing utilizing two processing engines. For example, the processing time interval 734 illustrates how PE1 and PE2 of MFE 200 can both perform pipeline processing within the processing time interval 734.

In an exemplary embodiment, PE1 starts processing cycle 726 to process JOB1 and PE2 starts processing cycle 728 to process JOB2. While JOB1 and JOB2 are in the processing stage, the job manager 204 performs memory prefetch operations at 736 and 738 to obtain data for JOB3 and data for JOB4, respectively. After PE1 and PE2 initiate memory writes to write the results for JOB1 and JOB2 into memory, they can begin processing JOB3 and JOB4. When the processing of JOB3 and JOB4 is complete, PE1 and PE2 initiate data writes to write the results for JOB3 and JOB4 into memory. It should be noted that the processing cycles do not require special synchronization in that cycle 726 and 728 do not need to start at the same time to have all the pipeline processing completed within the processing time interval 734.

Figure 8A:
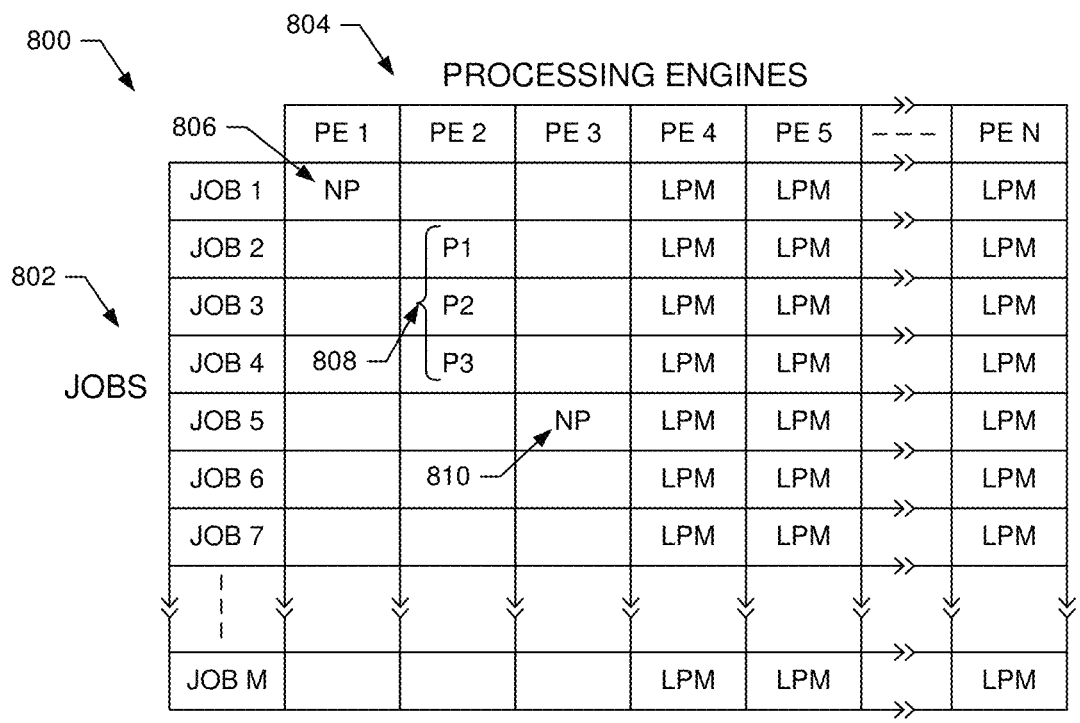
FIG. 8A shows an exemplary embodiment of an adaptive power profile for use with a multi-function element.

FIG. 8A shows an exemplary embodiment of an adaptive power profile 800. For example, the APP 800 is suitable for use as the APP 220 shown in FIG. 2. The APP 800 defines a relationship between jobs 802 and processing engines 804. The APP 800 can be configured to achieve one of the profile objectives as described above (e.g., low power utilization, maximum performance, load balancing, etc.). For simplicity, operation will be described with reference to PEs of the MFE 200 shown in FIG. 2.

For example, it will be assumed that the APP 800 is configured to restrict processing to just three processing engines (PE 1-3) while the remaining processing engines are gated to a low power mode. Thus, for example, processing engines (4-N) are gated to a low power mode by the job manager 204 to reduce power consumption.

To illustrate how the APP 800 is utilized, it will be assumed that the job manager 204 receives five (5) job requests. JOB (1) is assigned to be performed by PE1 in a non-pipeline (NP) process, as illustrated at 806. JOBS (2-4) are assigned to be performed by PE2 in a pipeline process (P1-P3), as shown at 808. JOB (5) is assigned to be performed by PE3 in a non-pipeline (NP) process, as illustrated at 810. Thus, as illustrated by the APP 800, the job manager 204 allocates jobs to the processing engines based on the APP 800 to achieve a selected level of performance, power utilization, or performance to power utilization ratio.

Figure 8B:
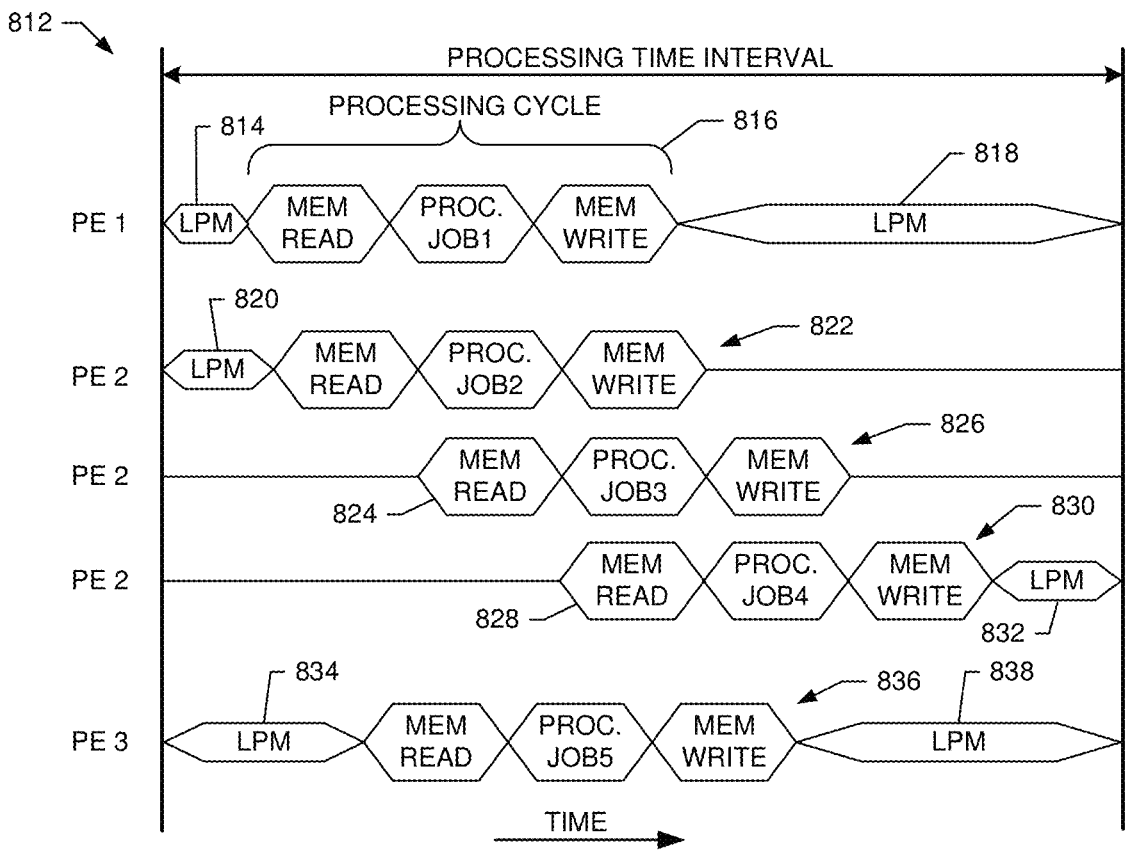
FIG. 8B shows an exemplary embodiment of a processing time interval that illustrates how the jobs shown in the adaptive power profile of FIG. 8A are processed by a multi-function element.

FIG. 8B shows an exemplary embodiment of a processing time interval 812 that illustrates how the job requests shown in FIG. 8A are processed. For example, according to the APP 800, the PE1 is allocated to process JOB1 in a non-pipeline mode (as shown at 806 in FIG. 8A) during the processing time interval. Initially, at the start of the processing time interval, PE1 is in LPM as illustrated at 814. The job manager 204 sends information about JOB1 to PE1 using bus 228 and sets it to the active mode using the appropriate enable signal 224. Once in the active mode, processing cycle 816 is started to process JOB1. At the end of the processing cycle 816, JOB1 is completed and the job manager 204 sets PE1 back to LPM as illustrated at 818.

The APP 800 also indicates that PE2 will process JOB2, JOB3, and JOB4 in a pipeline mode (as shown at 808 in FIG. 8A). At the start of the processing time interval, PE2 is in LPM as indicated at 820. The job manager 204 sends information about JOB2 to PE2 using bus 228 and sets it to the active mode using the appropriate enable signal 224. Once in the active mode, processing cycle 822 is started to process JOB2. While JOB2 is processed by PE2, the job manager 204 performs a memory prefetch at 824 to obtain data needed to process JOB3. After PE2 initiates the memory write cycle in processing cycle 822, PE2 can start processing JOB3 using data prefetched by the job manager 204. While JOB3 is processed by PE2, the job manager 204 performs a memory prefetch at 828 to obtain data needed to process JOB4. After PE2 initiates the memory write cycle of processing cycle 826, PE2 can start processing JOB4 using data prefetched by the job manager 204. After PE2 completes the processing cycle 830, JOB1, JOB2 and JOB3 have been completed in a pipeline process. The job manager 204 then sets PE2 to LPM as indicated at 832.

The APP 800 also indicates that PE3 will process JOB5 in a non-pipeline mode (as shown at 810 in FIG. 8A). At the start of the processing time interval, PE3 is in LPM as indicated at 834. The job manager 204 sends information about JOB5 to PE3 using bus 228 and sets it to the active mode using the appropriate enable signal 224. Once in the active mode, processing cycle 836 is started to process JOB5. At the end of the processing cycle 836, JOB5 is complete and the job manager 204 sets PE3 back to LPM as illustrated at 838.

Thus, the processing time interval 812 illustrates how the APP 800 is used to allocate jobs to processing engines. It should be noted that this description is exemplary and that more or fewer jobs may be received and processed within the processing time interval 812. It also should be noted that the APP 800 is designed to achieve low power operation since only three PEs are utilized and the remaining PEs are set to LPM. However, it is also possible to utilize more PEs (at higher power utilization) to process the five jobs. It also should be noted that the order of processing the jobs may be rearranged. For example, if JOB5 is designed to process the output of JOB1, then the job manager would not enable PE3 until PE1 completes JOB1. The job manager 204 would then enable PE3 to use the results of JOB1 to process JOB5. Thus, any processing order is possible within the processing time interval.

Figure 9:
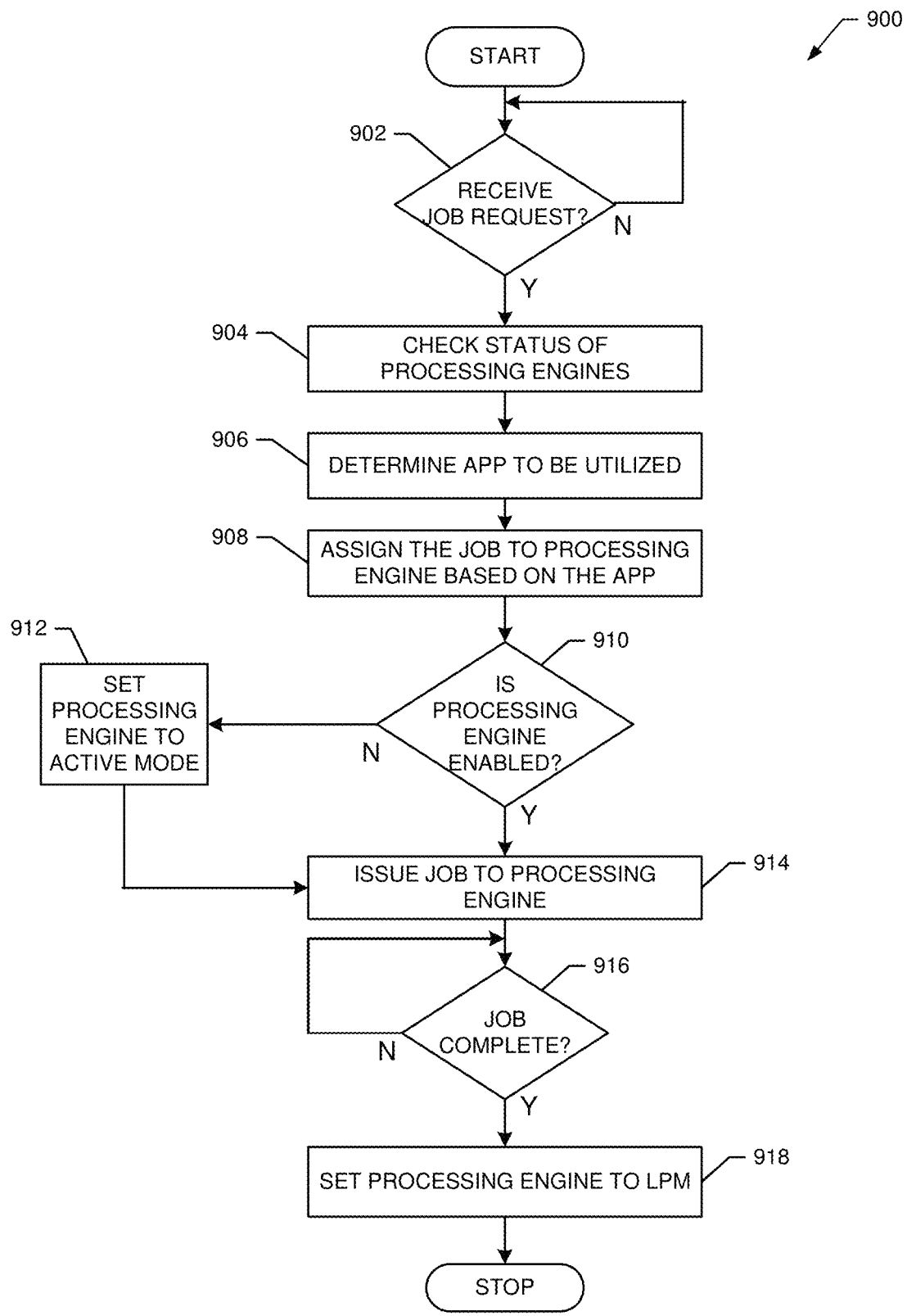
FIG. 9 shows an exemplary embodiment of a method for operating an MFE to perform adaptive power profiling in accordance with the exemplary embodiments of the present invention.

FIG. 9 shows an exemplary embodiment of a method 900 for operating an MFE to perform adaptive power profiling in accordance with the exemplary embodiments of the present invention. In an exemplary embodiment, the method 900 is suitable for use with the MFE 200 shown in FIG. 2.

At block 902, a determination is made as to whether a job request has been received. For example, in an exemplary embodiment, the job manager 204 determines when a job request is received from the bus 212. The received job request may be part of a sequence of jobs forming a processing pipeline. If a job request is not received, the method remains at block 902. If a job request is received, the method proceeds to block 904.

At block 904, once a job request is received the status of the processing engines is determined. For example, the job manager 204 checks the job load for each of the processing engines to determine which PEs are available. In an exemplary embodiment, the job load is defined as a function of one or more of the following; the number of processing jobs to be performed, the number of processing engines available to complete the processing jobs, the state of current jobs being processed, and the number of simultaneous jobs to be performed in order to perform adaptive power profiling. For example, given the state of the above parameters, a particular APP can be selected and utilized to achieve the desired system power utilization and/or performance.

At block 906, an APP is selected and checked to determine how the received job request is to be allocated to the available processing engines. For example, the job manager 204 determines an APP to utilize if more than one APP is available. In an exemplary embodiment, the job manager 204 selects the APP to be utilized from multiple available APP based on a received indicator 238. For example, in an exemplary embodiment, the APP 220 is used to determine which processing engine will perform the job task. For example, jobs are assigned in order to conserve power, maximize load on a processing engine, minimize load on a processing engine, or based on any other processing consideration that is represented in the APP.

At block 908, the job is assigned to a processing engine determined from the APP. For example, the job manager 204 determines from the current status of the processing engines and the selected APP a designated processing engine to perform the processing associated with the job.

At block 910, a determination is made as to whether the designated processing engine is currently enabled or active. If the designated processing engine is disabled (e.g., LPM), the method proceeds to block 912. If the designated processing engine is currently enabled or active, the method proceeds to block 914.

At block 912, the designated processing engine is enabled. In an exemplary embodiment, the method 1200 shown in FIG. 12 is performed to enable the designated processing engine.

At block 914, the job is issued to the designated processing engine. In an exemplary embodiment, the job manager 204 transmits the job parameters to the designated processing engine using the bus 228.

At block 916, a determination is made as to whether the job is complete. In an exemplary embodiment, the designated processing engine signals the job manager 204 when the job is completed. If the job is not complete, the method remains at block 916. If the job is complete, the method proceeds to block 918.

At block 918, the designated processing engine is gated or disabled. In an exemplary embodiment, the method 1008 shown in FIG. 12 is performed to disable the designated processing engine to place it in LPM.

Thus, the method 900 operates to perform adaptive power profiling at an MFE in accordance with one embodiment of the present invention. It should be noted that the method 900 is exemplary and that minor additions, changes, or rearrangement of the operations are within the scope of the embodiments.

Figure 10:
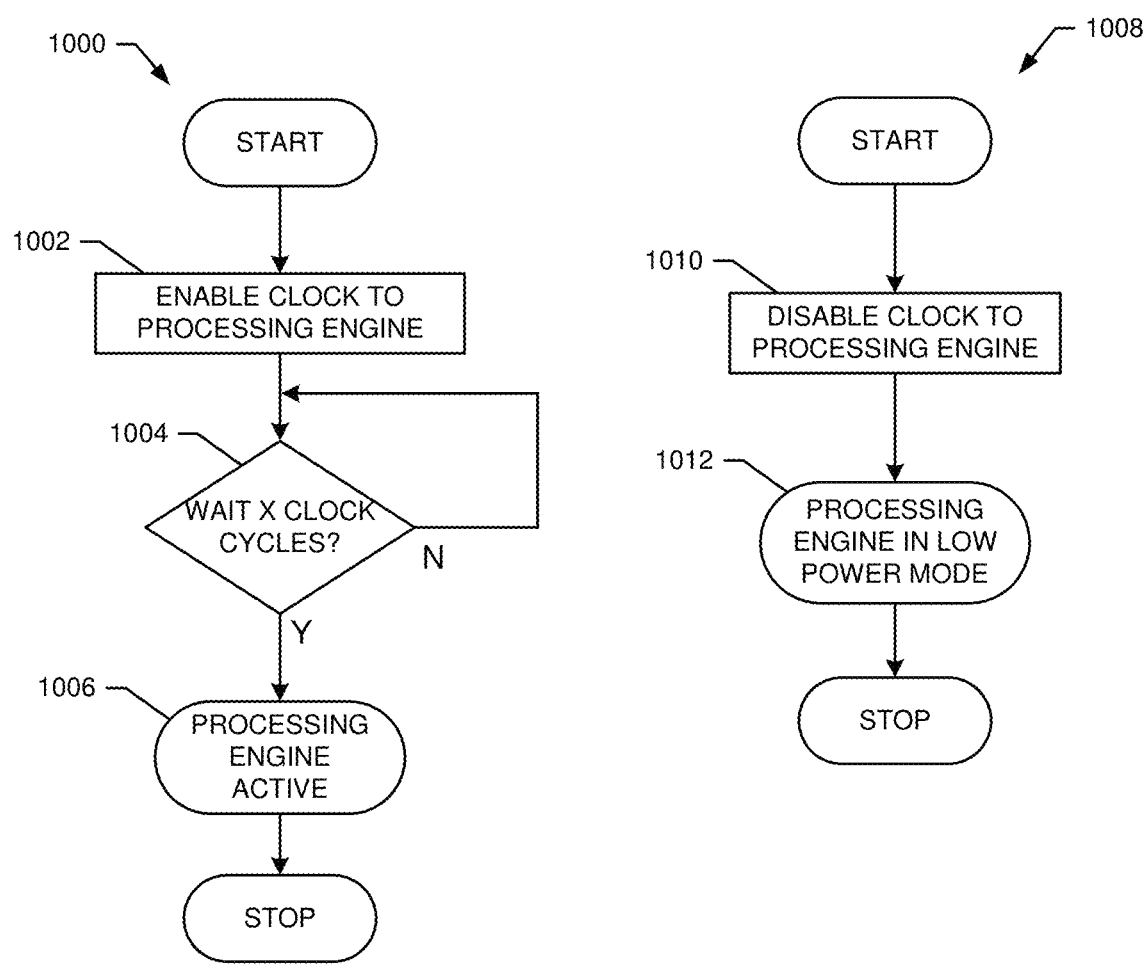
FIG. 10 shows an exemplary embodiment of methods for operating an MFE to gate (e.g., enable/disable) a processing engine based on an adaptive power profile in accordance with exemplary embodiments of the present invention.

FIG. 10 shows an exemplary embodiment of methods for operating an MFE to gate (e.g., enable/disable) a processing engine based on an adaptive power profile in accordance with exemplary embodiments of the present invention.

The method 1000 is a method for operating an MFE to enable a processing engine based on an adaptive power profile in accordance with exemplary embodiments of the present invention. For example, the method 1000 is suitable for use at block 912 of the method 900 shown in FIG. 9.

At block 1002, a clock to a processing engine is enabled. For example, the job manager 204 outputs the gate control signal 224 to the processing engine to enable a gated system clock.

At block 1004, a selected number (X) of clock cycles are counted to be sure that the processing engine is fully enabled. In an exemplary embodiment, 200 clock cycles are counted. If the selected number of clock cycles has not occurred, the method remains at block 1004. If the selected number of clock cycles has occurred, the method proceeds to block 1006.

At block 1006, the selected processing engine is fully active and ready to process the selected job.

The method 1008 is a method for operating an MFE to disable a processing engine based on an adaptive power profile in accordance with exemplary embodiments of the present invention. For example, the method 1008 is suitable for use at block 918 of the method 900 shown in FIG. 9.

At block 1010, the clock to the selected processing engine is gated or disabled. In an exemplary embodiment, the job manager 204 outputs the gate control signal 224 to disable a gated system clock at the selected processing engine.

At block 1012, the designated processing engine is now disabled and in a low power mode.

Thus, the methods 1000 and 1008 show exemplary embodiments for operating an MFE to gate (e.g., enable/disable) a processing engine based on an adaptive power profile in accordance with the present invention. It should be noted that the methods 1000 and 1008 are exemplary and that minor additions, changes, or rearrangement of the operations are within the scope of the embodiments.

While particular embodiments of the present invention have been shown and described, it will be obvious to those skilled in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A baseband subsystem configured to facilitate baseband signal processing in a base station, the subsystem comprising:
   a plurality of processing engines (PEs) operable to process data transmitted over the air via a wireless network, wherein each of the plurality of PEs includes a clock gating circuit (CGC) for facilitating power conservation; and
   an adaptive power profile (APP) coupled to one or more CGCs of the plurality of PEs and providing clock gating enable signals to activate a first portion of the plurality of PEs via corresponding CGCs for processing received data received from the wireless network in response to an APP selection indicator from a baseband processor at the base station.

2. The subsystem of claim 1, wherein the APP includes information relating to power utilization and load balancing for optimizing data processing.

3. The subsystem of claim 1, further comprising a job manager configured to maintain a second portion of the plurality of PEs in a low power mode by preventing the clock signals from reaching the second portion of the plurality of PEs.

4. The subsystem of claim 1, further comprising a memory read interface coupled to a job manager and configured to enter a low power mode for power conservation when an enable signal from the job manager indicates a disable mode.

5. The subsystem of claim 4, wherein the memory read interface is activated when the enable signal from the job manager indicates an enable mode.

6. The subsystem of claim 1, further comprising a memory write interface coupled to a job manager and configured to enter a low power mode for power conservation when an enable signal from the job manager indicates a disable mode.

7. The subsystem of claim 6, wherein the memory write interface is activated when the enable signal from the job manager indicates an enable mode.

8. The subsystem of claim 1, wherein each of the plurality of PEs includes a clock gating circuit (CGC) configured to receive the clock signals when the PE is in an active mode.

9. The subsystem of claim 1, further comprising a job manager configured to provide an enable/disable signal to at least one of the plurality of PEs based on stored APP and the APP selection indicator.

10. A method of wireless data processing with power conservation for a network communication, the method comprising:

receiving job requests from a packet processing subsystem in a baseband processor in a base station for data processing;

retrieving an adaptive power profile (APP) from a local storage in accordance with the job requests;

activating a first group of processing engines (PEs) for processing the job requests in accordance with the APP via turning on clocks to the first group of PEs by enabling clock gating enable signals from the APP to clock gating circuits (CGCs) of the first group of PEs; and placing a second group of PEs into a low power mode in response to the job requests for power conservation.

11. The method of claim 10, further comprising:

receiving an APP selection indicator from the packet processing subsystem; and allocating data processing associated with the job requests to the first group of PEs processing engines in response to the APP selection indicator.

12. The method of claim 10, further comprising driving a memory read interface into a low power mode in response to the job requests and the APP for power conservation.

13. The method of claim 10, further comprising driving a memory write interface into a low power mode in response to the job requests and the APP for power conservation.

14. The method of claim 11, further comprising modifying a portion of the APP based on the APP selection indicator.

15. The method of claim 10, wherein activating a first group of processing engines (PEs) includes driving system clock signals to clock gating circuits (CGCs) of the first group of PEs.

16. The method of claim 10, wherein placing a second group of PEs into a low power mode includes preventing system clock signals from reaching clock gating circuits (CGCs) of the second group of PEs.

17. A method of power conservation operating in a baseband subsystem for network communication, comprising:

receiving job requests from a baseband processor requesting a memory read operation for data processing;

retrieving an adaptive power profile (APP) from a local storage memory in a job manager in accordance with the memory read operation;

generating a memory read interface enabling signal in response to the APP;

activating a memory read interface into an active mode for memory read operation in response to the memory read interface enabling signal; and driving a memory write interface into a low power mode in response to the job requests and the APP for power conservation.

18. The method of claim 17, further comprising activating a first group of processing engines (PEs) for processing the job requests in accordance with the APP and the job requests.

19. The method of claim 18, further comprising driving a second group of PEs into a low power mode in response to the job requests and the APP for power conservation.

20. The method of claim 17, further comprising:

receiving an APP selection indicator from the baseband processor; and allocating data processing associated with the job requests to a first group of PEs processing engines in response to the APP selection indicator.

21. The method of claim 17, further comprising performing the data processing associated with the job requests using a pipelined process, wherein each of a first group of the processing engines performs at least two processing cycles at a time.

22. The method of claim 21, wherein the pipelined process includes:

starting a first processing cycle at a first processing engine to process a first job; and starting a second processing cycle at a second processing engine to process a second job.

23. The method of claim 22, wherein the pipelined process further includes starting a third processing cycle at the first processing engine to process a third job, wherein the first and the third processing cycles overlap.

24. The method of claim 23, wherein the pipelined process further includes starting a fourth processing cycle at the second processing engine to process a fourth job, wherein the second and the fourth processing cycles overlap.

* * * * *